Dec. 30, 1958  J. C. COBIN  2,866,244
CABLE DISCONNECT COUPLING
Filed Oct. 29, 1956
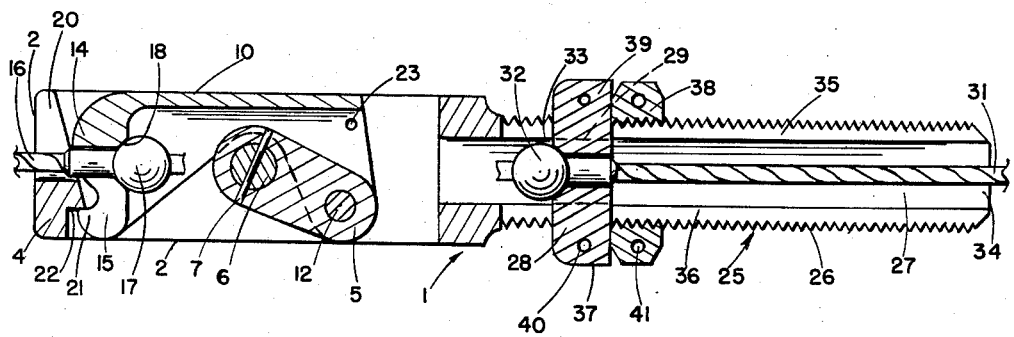
FIG. 3
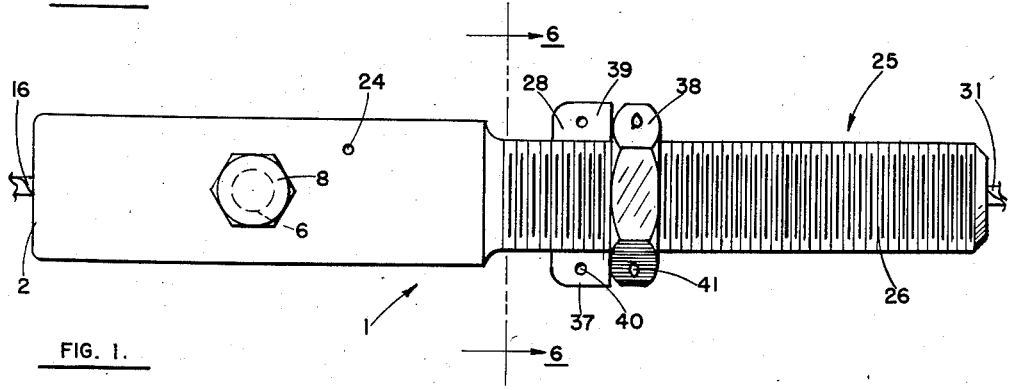
FIG. 1.
FIG. 2
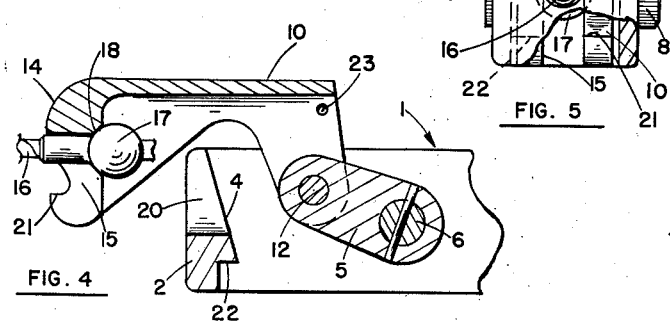
FIG. 5
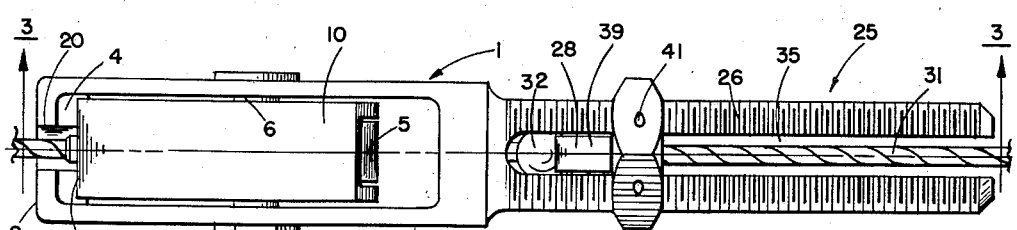
FIG. 6
INVENTOR.
JACOB C. COBIN
BY *Richard F. Carr*
ATTORNEY

United States Patent Office 2,866,244
Patented Dec. 30, 1958

2,866,244

CABLE DISCONNECT COUPLING

Jacob C. Cobin, Los Angeles, Calif., assignor to North American Aviation, Inc.

Application October 29, 1956, Serial No. 619,011

4 Claims. (Cl. 24—68)

This invention pertains to a cable coupling and more particularly to a coupling of adjustable, quick disconnect type.

Couplings of the general type of this invention may be used in any instance where it is desired to interconnect two cables, but are particularly adaptable for use with an aircraft. Normally in an aircraft there are many control cables which run throughout the interior of the ship, passing through and around various bulkheads and reinforcing members. Often the cables must pass through openings of restricted size so that there is generally a close clearance around the cables. Such cables are often made in sections so that two or more lengths of cable must be joined together in order to form one longer operative control medium. The ends of these cable sections should naturally be as small as possible, without projections, so that they may be easily passed through the restricted openings provided in the interior of the aircraft. Furthermore, a certain tension must be maintained in these cables so that movement thereof will be positive and uniform. A means should therefore be provided to allow for adjusting the tension of the cables so that it may be maintained at the proper value regardless of initial manufacturing tolerances or subsequent stretching of the cable material.

It is accordingly an object of this invention to provide a strong, light and compact cable coupling.

Another object of this invention is to provide a cable coupling requiring relatively small cable end fittings.

An additional object of this invention is to provide a cable coupling which may be very easily assembled.

A further object of this invention is to provide a cable coupling which is adjustable to provide a desired tension in the cables which are joined.

These and other objects will become apparent from the following detailed description taken in connection with the accompanying drawing in which:

Fig. 1 is a side elevational view of the coupling of this invention in the closed position;

Fig. 2 is a top plan view of the coupling;

Fig. 3 is a sectional view taken along line 3—3 of Fig. 2;

Fig. 4 is a fragmentary sectional view of one end of the coupling, similar to Fig. 3 but with the linkage open;

Fig. 5 is an end elevational view, partially broken away, of the coupling; and

Fig. 6 is a sectional view taken along line 6—6 of Fig. 1.

The objects of this invention are accomplished by providing a body member, to one end of which is attached an over-center linkage which pivots from an open position outside the body to an over-center locked position inside the body. One cable is retained by this linkage. The other end of the body includes a hollow portion having a threaded exterior with a slide within the hollow portion provided with extensions engaged by a nut on the threaded exterior. The slide retains the other cable and serves to adjust the cable tension.

Referring more specifically to the drawings there may be seen the body 1 of the coupling of this invention, end 2 of which includes a bifurcated section defining a hollow receptacle portion bounded by end wall 4. A link 5 is fixedly mounted on shaft 6 which is rotatably carried by the bifurcated portion of the body. Suitable means such as pin 7 may be provided to lock link 5 to the shaft. The exterior of shaft 6 is provided with a hexagonal or other suitably formed head 8 which may be engaged by an ordinary wrench for effecting rotation of the shaft.

A saddle member 10 is pivoted at one end by pin 12 to link 5, the longitudinal portions of this member straddling link 5 and terminating in end wall 14. Slot 15 in the end wall faces downwardly. This slot is dimensioned to pass freely cable 16 which includes ball end 17 swaged thereto. A seat 18 is provided in the end wall 14 for engagement with the cable ball 17.

Thus, in order to secure and retain cable 16, link 5 and saddle 10 are pivoted first to the open position of Fig. 4, and the cable is passed through slot 15 bringing ball 17 into engagement with seat 18. Then, by rotation of hexagonal head 8, link 5 and saddle 10 are brought to their closed position within the hollow bifurcated portion of the body. As this occurs the cable is received by upwardly facing slot 20 in end wall 4 of the body. End wall 14 of saddle 10 engages wall 4 of the body when in the closed position, while detent 21 projects beneath shoulder 22 which acts as a lock means preventing inadvertent disengagement of saddle 10 from the body. It should be observed that when the saddle assumes this position pin 12 is below the axis of cable 16 so that tension forces on the cable tend to close rather than to open up the linkage of the cable-holding device. In this manner saddle 10 and link 5 provide an over-center linkage which receives and engages the cable end and moves to an over-center position when moved to the closed retracted position, thereby positively holding the cable against the tension forces thereon. Downwardly facing slot 15 in the saddle with upwardly facing slot 20 in end wall 4 assure that the ball end and the cable cannot become disengaged from the saddle member.

It should be observed also that very little space is required in bringing the over-center linkage to its closed position. The open position shown in Fig. 4 illustrates how little member 10 projects beyond the lateral dimensions of the body. This requires far less space than the large pivotal members provided on prior art cable couplings. The fact that rotation may be accomplished by movement of the hexagonal head on pin 6 further reduces the space requirements for the cable coupling. It should also be noted that the slot 15 in saddle 10 always remains in its downwardly facing position as the cable linkage is moved from the open position to the closed position. This requires a minimum of movement of the cable and helps maintain the cable in engagement with the seat in the saddle member when the linkage is closed.

It is generally preferable to provide apertures 23 and 24 in the saddle and body to receive safety wire for further assurance that no forces imposed on the coupling will cause the over-center linkage to move to its open position. This possibility would only occur when no tension was on the cables.

Opposite end 25 of the body is in the form of an elongated cylinder having a threaded exterior 26 and a hollow bore 27 extending therethrough. Within bore 27 is a slide member 28 having a circular main section 29 substantially complementary to the interior of the bore. Slot 30 is provided on one side of the slide for passing freely cable 31 and permitting swaged ball end 32 to seat at 33 on the slide. This will be accomplished before the slide is brought through open end 34 for assembly within the bore of the body. In the assembled position the bore of the body precludes disengagement of the cable from the slide. End 25 of the body also includes opposed slots 35 and 36 which are disposed at 90 degrees to the opening 30 in the slide member. These slots receive ears 37 and 39 which project outwardly from the slide member. A nut 38 is received on the threaded exterior of the end of the body and engages the slide member retaining the same against tension on cable 31. By tightening the nut as desired any required tension may be imposed upon the two cables connected by the device of this invention. The nut and slide arrangement in the hollow cylindrical portion of the body assure that a maximum adjustment is obtained with a minimum of size and weight for the cable coupling device. The necessity for an additional conventional turnbuckle is eliminated by the use of this coupling. Safety wire openings 40 and 41 are provided in the slide and nut for fixing the same in their adjusted positions.

It is thus apparent that I have provided an improved quickly operable cable coupling whereby an over-center linkage is used to advantage in providing a member of light weight simple design requiring a minimum of space during and after assembly. The threaded exterior and slide arrangement provide a considerable amount of adjustment for setting the proper cable tension. The over-center lock assures that there will be no inadvertent disengagement of the cable coupling during service. This invention allows assembly of the cable ends and the cable coupling after the cables have been moved to their positions of adjacency. This means that it is not necessary to cut sizable clearance holes to draw large coupling members through the various bulkheads and other locations through which the cables may be required to pass. Also, the threaded terminals normally employed with adjustable couplings, are eliminated by the design of the invention whereby only ball ends are necessary on the cables. In this manner the entire cable installation is materially improved by utilizing the coupling of this invention.

The foregoing detailed description is to be understood as given by way of illustration and example only, spirit and scope of this invention being limited solely by the appended claims.

I claim:

1. A cable connecting device comprising a body; a cable holding means, said cable holding means including an over-center linkage pivotally connected to said body and movable between an open cable-receiving position remote from said body and an over-center closed position adjacent said body, said body including stop means engageable by said over-center linkage when in said closed position for precluding movement thereof in response to tension on a cable received thereby, said stop means being disengageable by movement of said over-center linkage away from its over-center position.

2. A cable connecting device comprising a body, said body having a bifurcated portion; a link pivotally mounted in said bifurcated portion; a cable-holding member pivotally connected to said link and movable therewith between an open position remote from said bifurcated portion and a closed position within said bifurcated portion, said cable-holding member having aperture means therein for receiving a cable, and an abutment adjacent thereto for engaging and holding an enlarged end portion of such a cable, said body having an end portion adjacent said bifurcated portion, said end portion having a slot therein opening toward and aligned with said slot in said cable holding member and positioned such that when said cable-holding member is in said closed position said cable passes through said slot in said body, said body and cable holding member having cooperating detent and stop means therein for retaining said cable-holding member when in said closed position for preventing movement thereof from tension imposed on said cable.

3. A cable connecting device comprising a body, said body having an open receptacle portion, a link pivotally connected to said body in said receptacle portion, a cable-holding member pivotally connected to said link and movable therewith between an open position remote from said receptacle portion to a closed position within said receptacle portion, said cable-holding member having an open-ended slot therein for ready reception and removal of a cable and an abutment adjacent thereto for engaging an enlarged end portion of such a cable, said abutment being positioned with respect to said pivotal connections to assume an over-center position when said cable holding member is in closed position, said body including stop means engageable by said cable-holding member when in said closed position for precluding rotation thereof in response to tension on a cable held thereby, said stop means being disengageable by movement of said over-center linkage away from its over-center position, said body having an end wall adjacent said receptacle portion provided with a slot opening toward said cable-holding member and aligned with said slot in said cable-holding member for receiving a cable engaged by said cable-holding member when said cable-holding member is in said closed position.

4. A cable connecting device comprising a body, said body including an end wall having an open slot therein and an abutment adjacent thereto, a cable-engaging member, said cable-engaging member having an end wall provided with an open slot therein aligned with and opening oppositely from the slot in said body, and an abutment adjacent thereto for engaging and retaining an enlarged end portion of a cable while said cable passes freely through said slot in said cable-engaging member; means connecting said cable-engaging member to said body for moving said cable-engaging member from an open position remote from said body to a closed position adjacent thereto, and in engagement with said abutment of said body while maintaining said cable-engaging member substantially parallel to the axis of said body during such movement, whereby a cable engaged by said cable-engaging member extends through said slot in said body.

References Cited in the file of this patent

UNITED STATES PATENTS

| | | |
|---|---|---|
| 2,375,548 | Gilmore | May 8, 1945 |
| 2,497,467 | Peters | Feb. 14, 1950 |